US010166624B2

(12) United States Patent
Furman et al.

(10) Patent No.: US 10,166,624 B2
(45) Date of Patent: Jan. 1, 2019

(54) HYBRID WELDING SUPPLY (71) Applicant: LINCOLN GLOBAL, INC., City of Industry, CA (US)

(72) Inventors: Edward Furman, Mentor, OH (US); Andreu Meckler, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 483 days.

(21) Appl. No.: 14/689,357

(22) Filed: Apr. 17, 2015

(65) Prior Publication Data

US 2016/0303677 A1    Oct. 20, 2016

(51) Int. Cl.
*B23K 9/10*    (2006.01)

(52) U.S. Cl.
CPC .......... *B23K 9/1081* (2013.01); *B23K 9/1043* (2013.01); *B23K 9/1087* (2013.01)

(58) Field of Classification Search
CPC ... B23K 9/1043; B23K 9/1081; B23K 9/1087
USPC .......... 219/133; 363/37, 20; 701/22; 290/44, 290/52
See application file for complete search history.

(56) References Cited

U.S. PATENT DOCUMENTS

| | | | |
|---|---|---|---|
| 3,593,121 A | 7/1971 | Jones | |
| 3,829,652 A | 8/1974 | Terry | |
| 4,663,536 A * | 5/1987 | Roesel, Jr. | H02P 9/10 290/45 |
| 5,250,786 A | 10/1993 | Kikuchi et al. | |
| 5,861,604 A | 1/1999 | McLean et al. | |
| 6,175,217 B1 * | 1/2001 | Da Ponte | H02J 9/066 322/19 |
| 6,348,671 B1 | 2/2002 | Fosbinder et al. | |
| 6,621,050 B2 | 9/2003 | Plantz | |
| 6,700,802 B2 | 3/2004 | Ulinski et al. | |
| 6,833,683 B2 | 12/2004 | Winkler | |

(Continued)

FOREIGN PATENT DOCUMENTS

| | | |
|---|---|---|
| CN | 102223127 A | 10/2011 |
| CN | 202565163 U | 11/2012 |

(Continued)

OTHER PUBLICATIONS

Ranger® 305 G product brochure, Lincoln Global, Inc., Publication E6.117, Issue Date Jan. 2010.

(Continued)

*Primary Examiner* — Tu B Hoang
*Assistant Examiner* — Vy Nguyen (57) ABSTRACT

A power source for an implement used to perform a welding or cutting operation, the power source including an engine component including a generator and a rectifier electrically connected to the generator and adapted to convert alternating current provided by the generator to a direct current, the engine component being switchable between an on condition and an off condition; at least one battery, wherein the engine component and at least one battery are electrically connected to a chopper bus; and a controller in communication with the generator, chopper bus, operation chopper, and the charging switch; an auxiliary power converter including at least one of a DC to AC and a DC to DC converter, the auxiliary power converter being electrically connected to the operation chopper and the at least one battery.

22 Claims, 4 Drawing Sheets

(56) References Cited

U.S. PATENT DOCUMENTS

| | | | |
|---|---|---|---|
| 6,982,398 B2* | 1/2006 | Albrecht | B23K 9/1006 |
| | | | 219/133 |
| 7,838,797 B2 | 11/2010 | Albrecht | |
| 8,080,761 B2* | 12/2011 | Matthews | B23K 9/1006 |
| | | | 219/130.1 |
| 8,115,328 B2 | 2/2012 | Fosbinder et al. | |
| 8,735,775 B2 | 5/2014 | Kaufman | |
| 8,759,714 B2* | 6/2014 | Fosbinder | B23K 9/1006 |
| | | | 219/130.21 |
| 8,803,032 B2 | 8/2014 | Matthews et al. | |
| 8,859,937 B2* | 10/2014 | DuVal | B23K 9/1068 |
| | | | 219/133 |
| 9,180,587 B2* | 11/2015 | Rozmarynowski | B25F 5/00 |
| 9,399,261 B2* | 7/2016 | Ulrich | B23K 9/095 |
| 2004/0041404 A1* | 3/2004 | McConnell | F01D 15/10 |
| | | | 290/52 |
| 2006/0037953 A1 | 2/2006 | Matthews | |
| 2007/0181547 A1 | 8/2007 | Vogel | |
| 2007/0262065 A1* | 11/2007 | Peters | B23K 9/092 |
| | | | 219/130.5 |
| 2007/0267997 A1 | 11/2007 | Kanazawa | |
| 2008/0264922 A1 | 10/2008 | Fosbinder | |
| 2009/0008368 A1 | 1/2009 | Beeson | |
| 2009/0008374 A1 | 1/2009 | Fosbinder | |
| 2010/0194354 A1* | 8/2010 | Gotou | B60L 3/003 |
| | | | 320/163 |
| 2010/0314181 A1* | 12/2010 | Beeson | B23K 9/1006 |
| | | | 180/53.5 |
| 2010/0314375 A1 | 12/2010 | Kaufman | |
| 2011/0006046 A1 | 1/2011 | Albrecht | |
| 2011/0114607 A1 | 5/2011 | Albrecht et al. | |
| 2011/0155710 A1 | 6/2011 | Farah et al. | |
| 2011/0180522 A1 | 7/2011 | Bunker et al. | |
| 2011/0190970 A1* | 8/2011 | Moriya | B60W 10/06 |
| | | | 701/22 |
| 2012/0069604 A1* | 3/2012 | Yagyu | H02M 1/34 |
| | | | 363/20 |
| 2012/0074116 A1 | 3/2012 | Matthews | |
| 2012/0099348 A1* | 4/2012 | Umetani | H02M 3/158 |
| | | | 363/37 |
| 2014/0069900 A1 | 3/2014 | Becker et al. | |
| 2014/0131329 A1 | 5/2014 | Meckler | |
| 2014/0246411 A1 | 9/2014 | O'Connor | |

FOREIGN PATENT DOCUMENTS

| | | |
|---|---|---|
| CN | 103722277 A | 4/2014 |
| CN | 203649616 U | 6/2014 |
| JP | S64-39235 A | 2/1989 |
| JP | 06-087082 A | 3/1994 |
| JP | H07-59268 A | 3/1995 |
| JP | 2011229219 A | 10/2011 |

OTHER PUBLICATIONS

Engine Driven Welder MSG Chopper, MOSA product brochure, dated Mar. 2004.

* cited by examiner

HYBRID WELDING SUPPLY

TECHNICAL FIELD

The present invention generally relates to a hybrid power source, having both an engine component and a battery component for supplying electrical power to an implement. More particularly, the present invention relates to a hybrid power source that includes a chopper bus that receives power from at least one of the engine component and battery component and a controller that may vary the contribution of each component to deliver a selected power output to the implement.

BRIEF SUMMARY

The following summary presents a basic understanding of some aspect of the system and method discussed herein. The summary is not an extensive review of the system and method nor it is intended to identify critical elements or delineate the scope of such systems and methods.

In accordance with one aspect, a topology for a hybrid power supply having an engine driven component and a battery component is provided. The topology includes a three phase diode bridge which converts alternating current from the engine component or generator to direct current. A chopper component is connected to the diode bridge to receive DC current from the generator. A battery is connected to the chopper. According to another aspect, a boost circuit for the battery is provided applying power from the battery to a chopper bus. According to another aspect, a battery monitor is provided to monitor output from the battery pack and to control the output therefrom. According to another aspect, a battery charger is provided to charge the battery when not welding. According to another aspect, a controller is provided to interface with the generator, chopper bus, welding chopper, and battery to control a boost converter and battery charger.

According to another embodiment, a power source for an implement used to perform a welding or cutting operation is provided. The power source including an engine component including a generator and a rectifier electrically connected to the generator and adapted to convert alternating current provided by the generator to a direct current, the engine component being switchable between an on condition and an off condition; at least one battery, wherein the engine component and at least one battery are electrically connected to a chopper bus; and a controller in communication with the generator, chopper bus, operation chopper, and the charging switch; an auxiliary power converter including at least one of a DC to AC and a DC to DC converter, the auxiliary power converter being electrically connected to the operation chopper and the at least one battery.

According to another embodiment, a power source is provided and includes an engine component including a generator, the engine component being switchable between an on condition and an off condition; at least one battery, wherein the engine component and at least one battery are electrically connected to a chopper bus; a rectifier electrically connected to the generator and adapted to convert alternating current provided by the generator to a direct current; a charging chopper electrically connected to the generator and the battery, wherein the charging chopper provides a selected power to the at least one battery; a charging switch between the charging chopper and the battery, wherein when the charging switch is activated power from the generator is routed through the charging chopper to the at least one battery; an operation chopper electrically connected to the generator, wherein the operation chopper is adapted to provide a selected power output to the implement; a battery boost converter electrically connected to the at least one battery; and a controller in communication with the generator, chopper bus, operation chopper, and the charging switch; an auxiliary power converter including at least one of a DC to AC and a DC to DC converter, the auxiliary power converter being electrically connected to the operation chopper and the at least one battery.

DETAILED DESCRIPTION

As used herein, "power source," includes but is not limited to, portable power generation or backup power generation for heating, plasma cutting, welding, and gouging. The power source may be used in any "operation" which may include but is not limited to a welding operation, such as, welding, brazing, soldering, coating, hard facing, or heating, or a cutting operation such as machining, gouging and cutting. "An implement," as used herein means a device electrically connected to the power supply for purposes of obtaining power therefrom to perform an operation. Implement may include a torch or other device for generating an arc suitable for the operation including but not limited to a welding torch, a plasma cutter and the like. The power source may be connected to a manually operated implement such as a hand held implement or connected to an automated system such as a robot welder, mobile welding platform such as a rover or orbital welding platform. Typical welding operations, include, but are not limited to, a shielded metal arc welding (SMAW), (e.g., stick welding), flux cord arc welding (FCAW) and other welding processes such as gas metal arc welding (GMAW), gas tungsten arc welding (GTAW), and the like.

According to an embodiment, an attainable operation output power generally follows from an input power from the power source. An amount of input power deliverable from the power supply can depend on various conditions and/or circumstances related to the power supply, the welder, and/or the environment. Accordingly, given that the amount of input power deliverable can be variable, the attainable welding output power is also variable. For example, a hybrid welding system can include a welder and a power supply including an engine-driven generator and a battery system. When the generator becomes inoperable (e.g. the engine runs out of fuel), the amount of input power deliverable changes to only what the battery system provides. Thus, the attainable welding output power changes to a value derived from power delivered from the battery system alone. A similar change can occur in such a hybrid welding system when, for example, a charge of the battery system runs low, which leaves the engine-driven generator to solely provide the input power.

Other factors beyond power source availability can impact the amount of input power deliverable and, consequently, the attainable or achievable welding output power. For instance, a condition of a power source influences the amount of input power. The condition can relate to a physical condition or an operational condition of the power source, or an environmental condition associated with an environment in which the power source is located. Some exemplary power source or power supply conditions include, without limitation: a fuel type (e.g. gasoline, diesel, etc.); fuel properties (e.g. characteristics, composition, etc.) which can be variable depending on fuel mixture; an operating temperature (e.g. temperature of or within the power source); a coolant level; oil or lubrication level; an air flow; an air filter condition; an amount of fuel; a manufacturing date (or time since manufacture); a operational time (e.g. time in service); materials utilized in components of the power source; expected lifetime of components or materials; a number of cycles (for battery systems); and the like. To illustrate, an engine-driven generator utilizing a fuel consisting of gasoline blended with ethanol may provide less power output than the same engine-driven generator deriving power form a pure gasoline fuel. In another illustration, a clogged air filter can restrict an amount of air reaching a cylinder of the engine resulting in a less efficient or less energetic combustion reaction, which may also create a reduction in deliverable power. In yet another example, the deliverable power can decrease over time as the power source, or components thereof, age and/or wear through use. For example, an engine-driven generator, through age and wear, can begin to lose compression, which leads to a reduction in deliverable power.

While having an impact on output (i.e. deliverable power), the physical or operational condition of the power source, as described above, can also influence efficiency such as fuel efficiency for engine-driven generators or charge/discharge efficiency for battery systems. For instance, different fuel mixtures can be consumed at different rates. Operating temperature may also affect efficiency. An engine driven generator may operate less efficiently at a higher operating temperature than the same system at a lower operating temperature. To that end, a user may wish to alter the contribution of a non-engine component to compensate for the differences in efficiency.

Also, an engine component is a source of noise. To generate sufficient power the engine may have to operate at higher rate often measured in revolutions per minute (RPM). This increase in the rate of the engine provides a corresponding increase in the pitch and level of noise measured in decibels (dB). While certain decibel levels may be tolerable when working in open conditions, such as an outdoor space with no enclosure, operating indoors or within an enclosed space may increase the intensity of the noise or make the noise a nuisance to other occupants of the space. The exhaust fumes created by the engine component are also a concern when operating in an enclosed space.

To provide greater flexibility of use, according to an aspect of the invention, the user may increase the contribution of the non-engine component to reduce the noise generated by the engine component. According to this aspect, the user may increase the contribution of the non-engine component to at least 100% of the engine component's contribution allowing the engine component to be temporarily shut off eliminating the noise created by the engine. This also eliminates any exhaust created by the engine making the welder more flexible in moving from outdoor spaces to indoor spaces. In a further aspect, the welding system can utilize an amount of power available from a power source (and/or an amount of time a given power level can be delivered) to control a welding output from a welding power source. As utilized herein, a "welding output" refers to an output current, an output voltage, or both, which is generated by a welding power source to produce a weld or machine metal when used as a plasma cutter. The welding system controls the output current, the output voltage, or both to prevent the welding output power from exceeding the amount of power available from the power source. In one example, the welding power source can be directly controlled to enforce this limit. In another example, the welding system can enforce this limit by constraining settable values of a welding output preset. For example, the welding system can configure a user interface of the welding system to prevent an operator from establishing a welding output preset beyond a capability of the power source. It is to be appreciated that the welding system, either through pre-determined data or through analysis of physical or operation condition information of the welding power source, determines an efficiency of welding power source. That is, for a given power level delivered by the power supply, the welding system can determine a corresponding welding output power based on the efficiency of the welding power source.

By way of illustration, a welding system can have a rating or capability to generate a welding output of 333 A at 30V (i.e. approximately 10,000 W), but condition information indicates a deliverable power from the power source which corresponds to a welding output power of 9000 W. Accordingly, the welding system can control generation of the welding output or the user interface to limit the welding output to 300 A at 30V, for example.

Exemplary embodiments will now be described with reference to the drawings. The examples and drawings are illustrative only and not meant to limit the invention, which is measured by the scope and spirit of the claims. Like reference numerals refer to like elements throughout.

Figure 1:
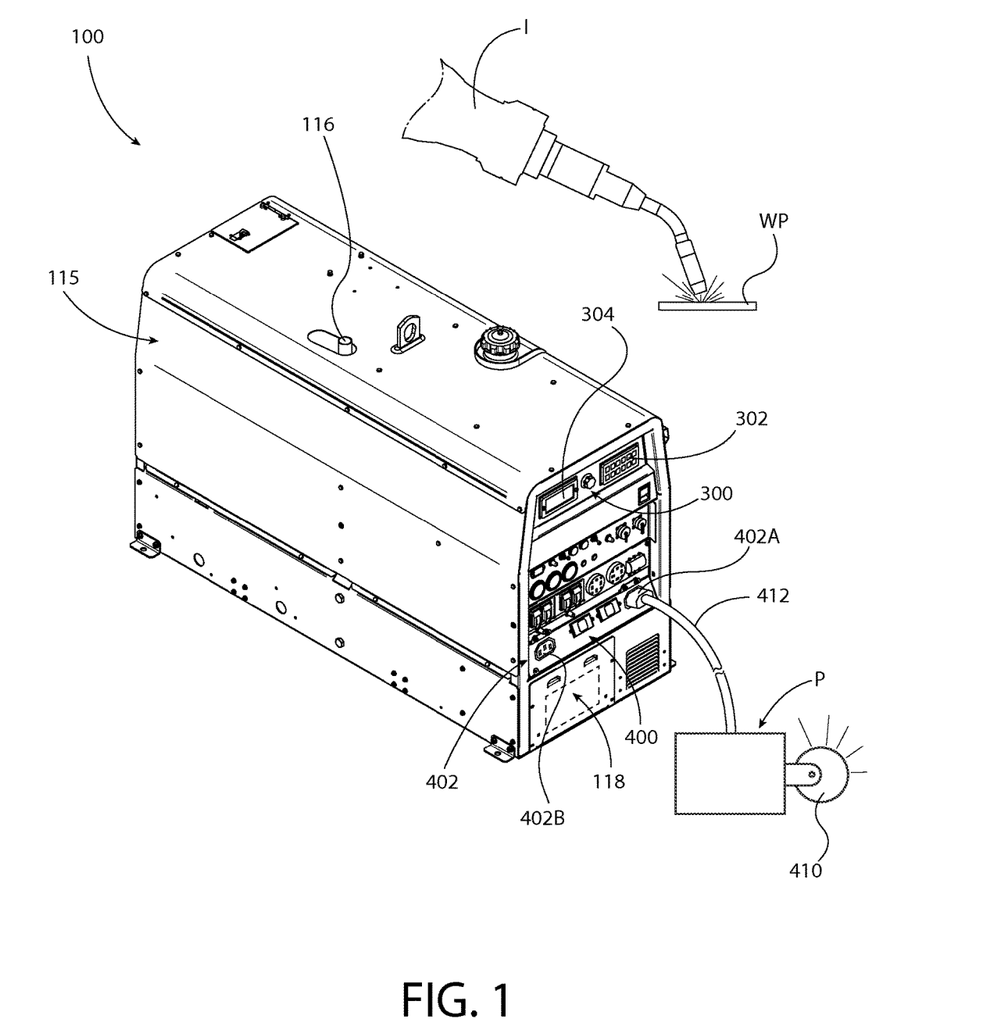
FIG. 1 is a partially schematic view of a hybrid power source according to one embodiment.

A power source according to one embodiment is generally indicated by the number 100 and shown schematically in FIG. 1. Power source 100 is a hybrid system in that energy is provided from two distinct sources. Power source 100 includes a generator 112 driven by an engine 114. Engine 114 may include an internal combustion engine, including but not limited to diesel engines, gasoline engines, LP gas engines, and the like. The generator 112 produces electric energy during operation of the engine 114. Generator 112 may include a synchronous 3-phase alternator. Alternatively, generator could be a single phase alternator or DC generator, as desired. The engine and generator may be collectively referred to as an engine-driven component or engine component 115. Engine component 115 may be housed within a housing H, and may include an exhaust 116 that protrudes outward from housing H.

The hybrid power source 100 further includes a battery 118. Battery 118 may include at least one battery or a plurality of batteries or cells, such as a battery bank, to provide a DC voltage suitable for an operation. For example, in a welding application, AD-100 (VDC) may be supplied. The term, "battery" as used herein refers to both individual batteries and banks of batteries, i.e., multiple batteries connected in series. The generator 112 alone or battery 118 alone may supply sufficient power for a given operation or be operated together as will be discussed more completely below.

Figure 2:
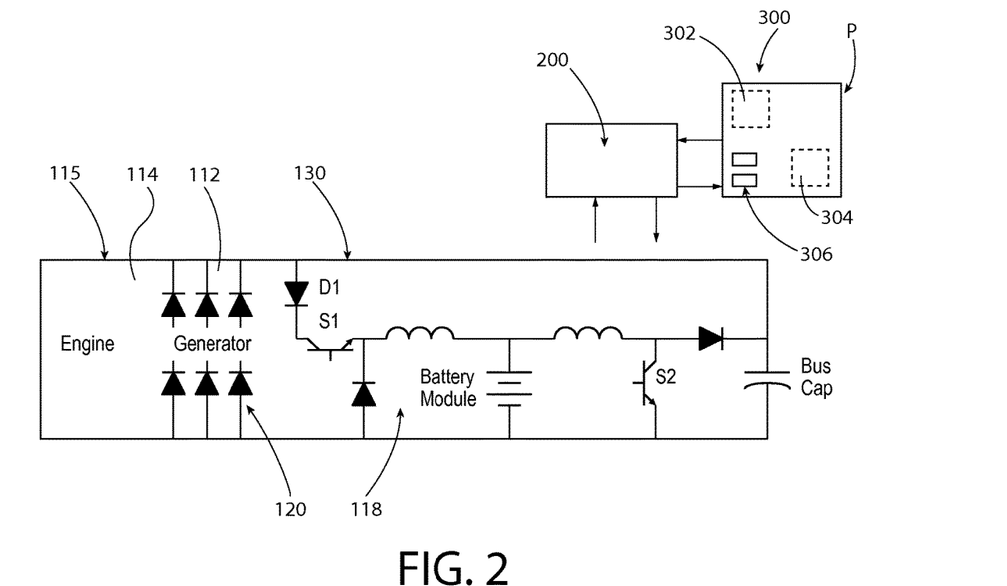
FIG. 2 is a circuit diagram according to one embodiment.

As best shown in FIG. 2, hybrid power source 100 includes a diode bridge generally indicated by the number 120 electrically connected to the engine driven component 115. Diode bridge 120 is electrically connected via a chopper bus 130 to an output 140. Output 140 may in turn be connected to an implement I to perform an operation. Battery 118 may be connected in parallel with generator 112 and supply power to output 140 as well. Battery 118 is connected such that it provides power to output independently of generator 112 or with generator 112. In this sense, power to output 140 may be provided by at least one of the engine driven component 115 and/or battery 118 such that power sufficient to perform the operation may be provided by engine component 115 or battery 118 independently, or battery 118 may supplement power from generator 112 allowing the generator to droop. Alternatively, supplemental power from battery 118 may be used to allow generator 112 to operate at a steady state condition and meet fluctuations in demand from output with power from battery 118 as described in examples below.

Alternatively, the configuration shown may be used to charge the battery 118 when power capacity from generator 112 is greater than demand from output. For example, generator 112 may be operating at 3000 rpm to generate sufficient power for an operation, but is capable of operating at a higher rpm to generate additional power that could be committed to charging battery 118. For example, engine generator 112 could be operated at 3500 rpm to increase the power generated and the excess power directed to battery 118 for charging.

The generator 112 provides power to the chopper bus 130. Three phase engine driven generator output will be rectified and used to directly supply the chopper bus 130. The generator 112 can be controlled by field control or run with a field in saturation and allow chopper bus 130 to droop. If auxiliary outputs are derived from chopper bus 130 they can be run off of battery pack when engine is off, as described more completely below. Generator 112 can use field control to eliminate droop in chopper bus voltage. A boost circuit, generally indicated at 150, is created for battery 118 to provide power to the chopper bus 130. A battery monitoring component, generally indicated at 170, may be used to control and monitor battery 118 or provide feedback to a controller, as described below. Generator 112 may be used to charge battery 118 when not welding or battery 118 may be connected to an external battery charging source as needed.

Figure 3:
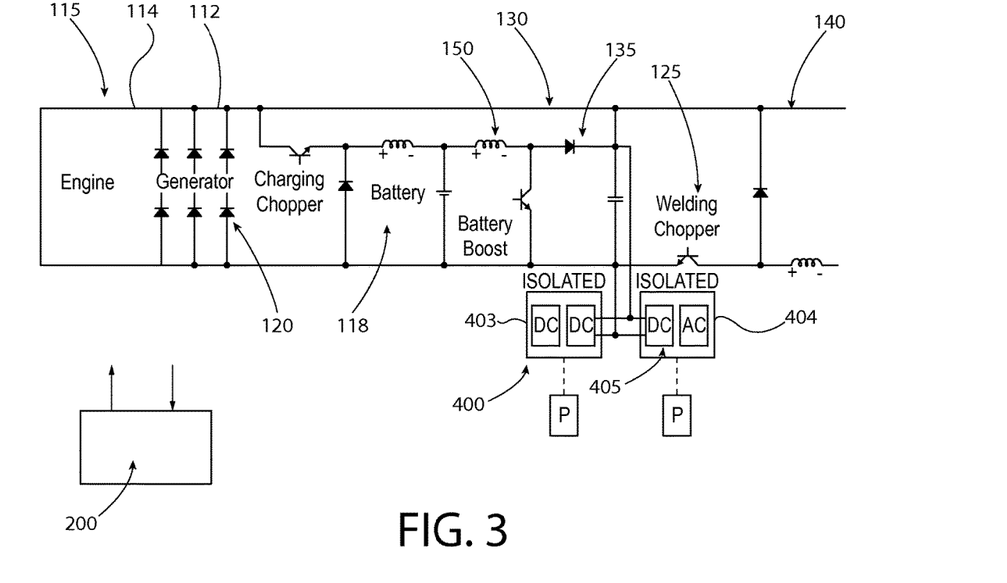
FIG. 3 is a circuit diagram according to another embodiment.

With reference to FIGS. 1-3, power source 100 may include a controller 200, which can for example, be a microcontroller, system on a chip, a microprocessor, a logic controller or logic circuit implementing aspects described herein. Controller 200 interfaces with the generator 112, battery 118, chopper bus 130, and operation chopper 125 and will control the boost circuit 150 and battery charging. Isolated DC to DC and isolated DC to AC supplies are created to run off chopper bus 130. When engine is off, battery 118 can supply chopper bus 130 until engine comes on or until battery 118 is drained to its minimum level. Battery 118 supplies additional power in parallel with generator 112.

Figure 5:
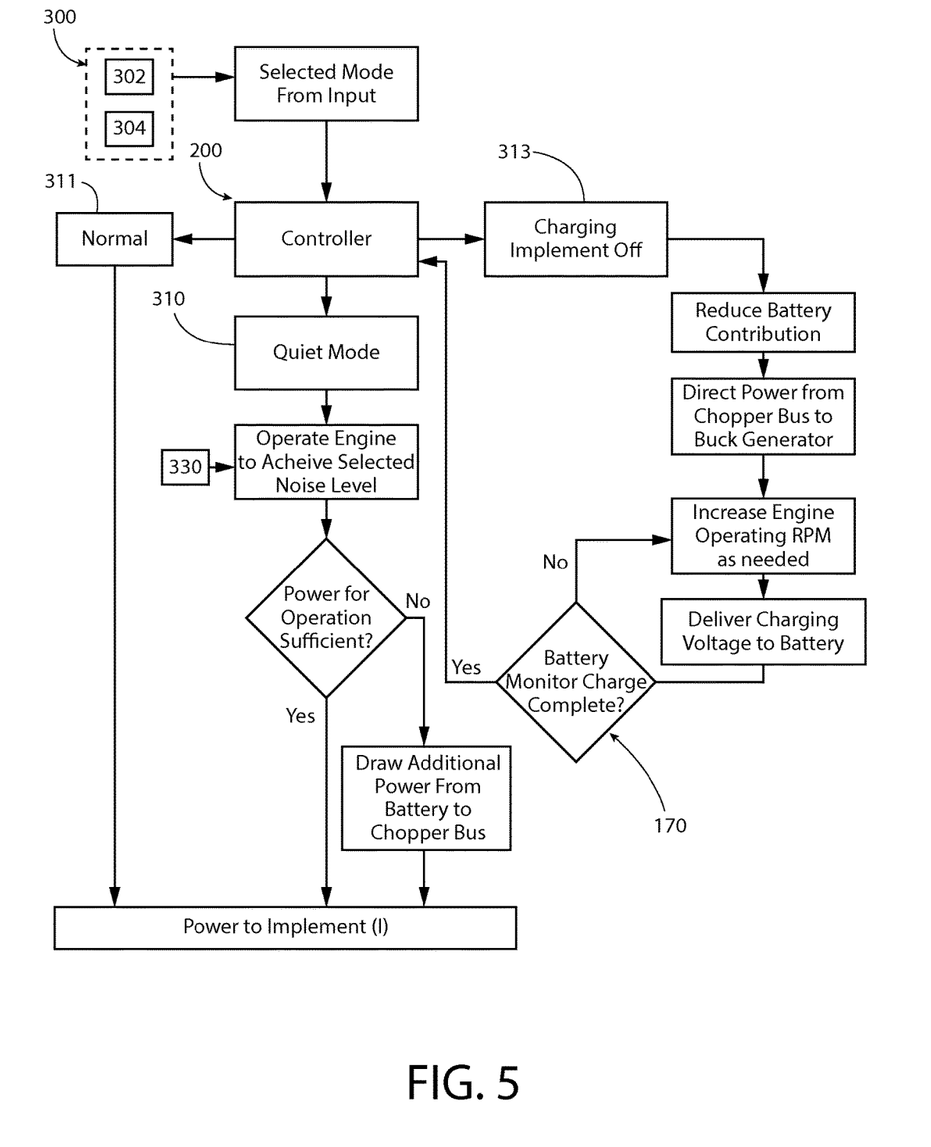
FIG. 5 is an operational diagram of a power source according to one embodiment.

According to an embodiment shown in FIG. 3, battery 118 is charged from chopper bus 130 through a buck regulator 135. Any type of battery including but not limited to NiCd, lithium ion, and lead acid batteries may be used. Depending on the type of battery 118, operation of buck regulator 135 may be controlled to ensure proper charging and avoid overheating or other issues. In the example shown, battery 118 is a lithium ion battery. Buck regulator 135 is controlled to facilitate proper charging techniques for this type of battery 118 and, in this example, charging occurs when a welding operation is not being performed. For example, according to an embodiment of the invention, when not operating implement I the 90V provided by generator 112 may be stepped down to 58V by buck regulator 135 to charge battery 118. One example of a charging routine implemented by hybrid power source 100 is schematically shown in FIG. 5. As discussed, controller 200 may ensure that implement I is off in order to reduce the battery contribution and redirect power delivered to chopper bus 130 from engine component to a buck regulator 135 to step it down for charging of battery 118. A battery monitor 170 may be provided to determine the amount of charge on battery 118 or to simply indicate to controller 200 that charging is complete.

Figure 4:
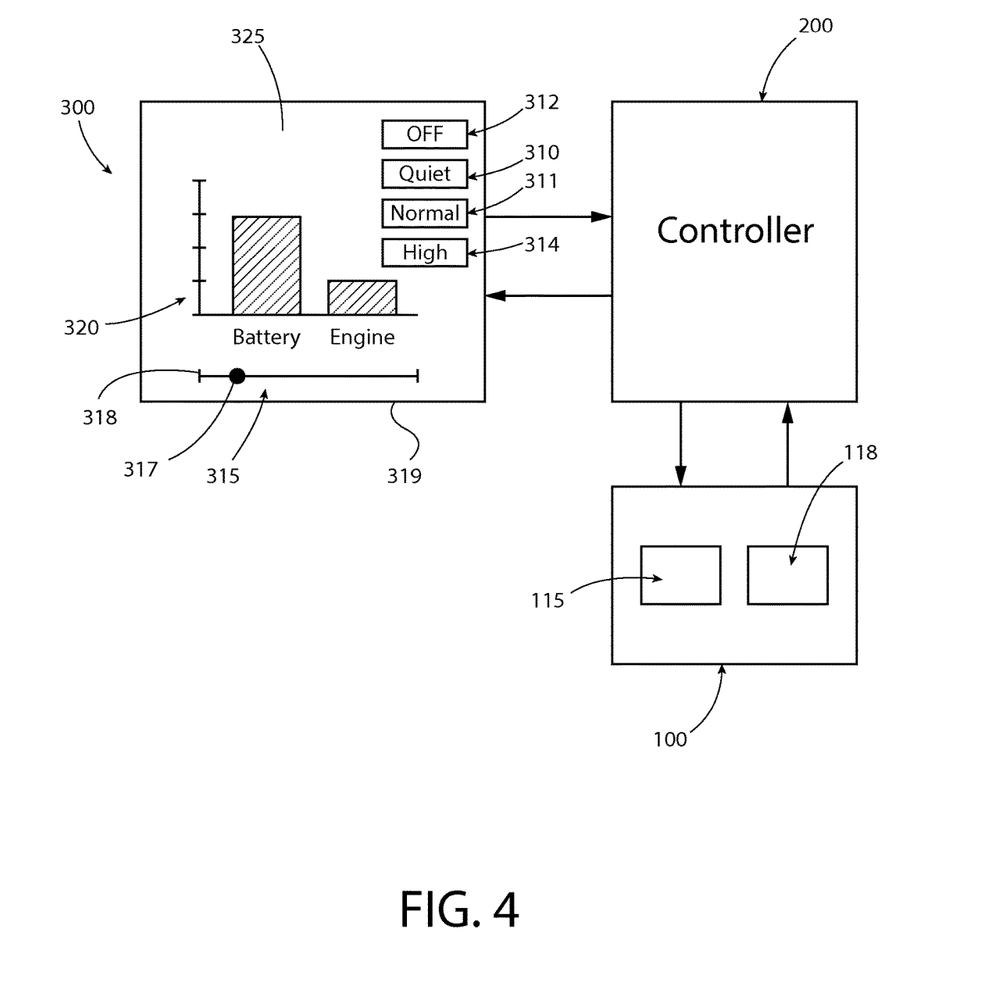
FIG. 4 is a partially schematic view of an interface in a hybrid power source according to one embodiment.

Power source 100 may also include an interface 300 that allows the user or operator to manually control or influence contribution of the engine component 112 relative to battery component 118. For example, interface 300 may communicate with controller 200 to deliver input from the operator as to at least one desired operating condition for the engine component 112 relative to battery 118. To that end, interface 300 may include any suitable device or component for communicating information from operator to controller 200 or directly to the circuit when a controller 200 is not used. The input 302 for interface may include but is not limited to a slider, a knob, a switch, a keypad, a touch screen, a button and the like. The input 302 may be provided on the same housing as power source 100 or may be provided remotely such as on a pendant, remote control, or mobile phone with signals from input 302 being communicated to power source 100 or controller 200 by wired or wireless connections including but not limited to wireless LAN protocol; Bluetooth, Wireless USB, or other similar RF protocol; a cellular radio protocol; satellite protocol; an infrared protocol; or the like. In the example shown in FIG. 1, input includes a keypad K having plural buttons B. In FIG. 4, a touchpad acts as the input 302. These examples are not limiting. Interface 300 may include an output 304 that provides information to the operator as to the selected operating condition and may include but is not limited to a decal or painted indicator on the housing adjacent to input 302, a digital display, touch screen, LEDs or other lighted display, and the like. In the example shown, FIG. 1, output 304 includes a digital display. In FIG. 4, output 304 includes a touchpad. These examples are not limiting. To facilitate wired communication, interface 300 may include suitable communication ports 306 (FIG. 2) to connect wired input 302 or output 304 components. The communicating port 306 may include but is not limited to video ports, serial ports, parallel ports, USB ports, and the like. It will be understood that components shown in the embodiments shown in the various figures may be interchanged amongst the other embodiments. The embodiments shown are not limiting.

Interface 300 may include various operating modes allowing the user to control the contribution of the engine component 115 and battery 118. These modes may include a mode where the controller 200 controls the contributions automatically. In the example shown in FIG. 4, a normal mode 311 is selectable where the engine and battery component are operated by the controller 200 automatically. In this mode, controller 200 may vary each contribution to provide the output for implement I and perform charging of battery 118 if additional power is available and charging is needed. A high mode 314 may be provided to boost power to implement I, as described. It will be understood that fewer or more modes may be provided on interface 300 and the example shown is not limiting. Likewise the type of interface 300 may vary as discussed herein. The example shown in FIG. 4 includes a touch screen 325 that combines input 302 and output 304 functions in one unit. As shown in FIG. 4, interface 300 may include a contribution input 315 that includes a balance control that allows the user to manually adjust the contribution of the engine component 115 relative to battery 118. Output 304 may include a contribution display, generally indicated at 320, that shows at least one of the contributions of engine component 115 and battery 118. In the example shown, component display 320 includes a bar graph 322 that displays relative contributions of both engine component 115 and battery 118. Also in this embodiment contribution input 315 is a slider on the display that allows the user to shift the balance between engine component 115 and battery 118. In this example, at the center point, both engine component 115 and battery component are operating at full capacity. Deviating away from center reduces the contribution of one of the engine component 115 or battery 118. For example, as shown, the engine component contribution may be reduced by sliding contribution indicator 317 toward the battery side 318 of slider scale. Likewise, contribution of battery 118 may be reduced by sliding indicator 317 toward the engine side 319. In this example, varying the contribution manually to reduce the contribution of engine component 115 may be used to reduce noise output or turn engine component 115 off. Alternatively, as described below, a quiet mode 310 may be provided to allow controller to adjust the contribution of engine component 115 to achieve a desired noise output. In this mode, contribution input 315 may provide the user with additional fine tuning ability to further tweak the contribution as desired. In this sense, controller 200 may operate as an open system allowing additional input from user. Alternatively, as shown in FIG. 5, controller may operate as a closed system, where once the mode is input from interface 300, controller 200 operates according to a preprogrammed routine. For example, selection of three modes are shown in FIG. 5 (quiet 310, normal 311, and charging 313). As discussed, normal mode, controller 200 controls application of power to implement directly and may vary the contribution of engine component 115 and battery 118 as needed based on production of the output for operation to implement I. In quiet mode, engine component 115 is operated to achieve a selected noise level. The noise level may be a decibel level that is monitored by a noise sensor 330 as schematically shown, or controller 200 may be programmed to include selected engine RPM levels to produce a selected noise level based on testing data. Using the 90 dB level as an example again, if testing data indicates that the engine component produces the desired 90 dB level at or about idle RPM, the engine component 115 may be operated at idle RPM. Power output from battery 118 to chopper bus 130 is adjusted by controller 200 to deliver the output power needed for the operation based on the selected engine component 115 contribution.

According to one embodiment depicted in FIG. 4, interface 300 includes a quiet mode 310 of operation that may be selected to reduce the noise level (decibels) generated by the engine component 115 to a selected level. For example, quiet mode 310 may reduce the decibel level to a level no greater than 90 dB. This level is one example. It will be understood that other levels may be provided. When quiet mode 310 is selected, a contribution of engine component 115 to chopper bus 130 is reduced to lower the operating rpm of the engine to produce a decibel level within the desired quiet range. It will be understood that other ranges may be established by the designated quiet mode including a 0 dB output where the engine component contribution is reduced to 0 and battery 118 provides the entire welder output. To that end, interface 300 may include an off mode 312 where engine component 115 is off.

The quiet mode output level may also be influenced by the decibel output of engine component 115 at idle. For example, if at idle, engine component produces a noise output of about 90 dB, the operator's selection of quiet mode 310 may cause the engine component 115 to be driven at idle speed and the contribution of battery 118 to chopper bus 130 adjusted to provide the desired output for the operation. If the decibel output of the engine component 115 is lower than the selected output for quiet mode, engine component 115 may be driven at an rpm greater than the idle level. It will be understood that multiple noise output levels may be selected by operator through input 302. As one example, operator may have the ability to select a particular decibel level for operation with the engine component 115 operating at an rpm greater than idle, a second decibel level placing engine component 115 at idle, and a third decibel level corresponding to the engine component by turned off. When noise restrictions are imposed by an operating environment, input 302 may allow the user to input the maximum noise level permitted and controller 200 varies the contribution of engine component 115 relative to battery 118 to chopper bus 130 to stay at or below the set limit.

According to another embodiment of the invention, depicted in FIGS. 2 and 3, power source 100 provides power to a peripheral P even when engine component is in an off condition. The peripheral P may be any component that requires power and may include internal components i.e. those that are provided on housing H or an external component that is not provided on housing and is connected to power source 100. In the example shown in FIG. 2, peripheral P is interface 300. In this example, controller 200 supplies power to interface 300 even when engine component 115 is not operating. For example, controller 200 may draw power off chopper bus 130 from battery 118 to power interface 300. In the example shown, a 40 VDC supply is drawn from battery 118 via chopper bus 130 when engine component 115 is off to power interface 300. It will be appreciated that this requirement may vary depending on the type of interface 300 and its input 302 and output 304 components. According to the embodiment shown in FIG. 3, peripheral may include an external component that is connected to power source 100. As in the case of the internal component described above, power to external component may be provided when engine component 115 is in an on condition or when engine component 115 is in an off condition.

According to another embodiment, an auxiliary component, generally indicated at 400, is connected to chopper bus 130. Auxiliary component 400 may include an outlet 402 that provides auxiliary power for a peripheral device P including but not limited to portable grinders, pumps, air compressors, entertainment devices, coffee makers, computers, or other device that might be on a jobsite and requires power. With reference to FIG. 3, one example of a peripheral P is a grinder 410. There, grinder 410 is connected by a power cord 412 to power source 100 at outlet 402A.

Auxiliary component 400 may include at least one of an isolated DC to DC supply 403 and DC to AC supply 404 that run off chopper bus 130. Auxiliary component 400 may include an AC chopper 405 connected to chopper bus 130 for the DC to AC supply. AC chopper 405 may in turn be connected to outlet 402 (FIG. 1) to provide AC power to a peripheral P connected via the outlet 402. Likewise, a DC component may be connected to DC to DC supply 403 via an outlet. As shown, multiple outlets 402 may be provided. For example, one outlet 402A may be an AC outlet connected to AC supply 404 and a second outlet 402B may be a DC outlet connected to DC to DC supply 403. Alternatively, multiple AC or multiple DC outlets may be provided. Since auxiliary component 400 is connected to chopper bus 130, which receives power in parallel from engine component 115 and battery 118, auxiliary component may be driven by either or both of the engine component 115 and battery 118 power. This provides flexibility to turn off the engine component 115 and continue to provide power to auxiliary component 400 from battery 118 or vice versa. As discussed, it may be desirable to run auxiliary component 400 from the battery 118 only when noise or exhaust fumes are a consideration. Alternatively, it may be desirable to use solely engine power when the battery 118 is being recharged.

While principles and modes of operation have been explained and illustrated with regard to particular embodiments, it must be understood that this may be practiced otherwise than as specifically explained and illustrated without departing from its spirit or scope.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A power source for an implement performing a welding or cutting operation comprising:
   an engine component including a field-controlled generator, the engine component being switchable between an on condition and an off condition;
   a rectifier electrically connected to the field-controlled generator, wherein the rectifier converts alternating current provided by the field-controlled generator into a direct current;
   at least one battery, wherein:
      the engine component and at least one battery are electrically connected to a chopper bus,
      the chopper bus is connected across the rectifier, and
      a voltage droop of the chopper bus is controlled by field control of the field-controlled generator;
   a charging chopper electrically connected to the field-controlled generator and the at least one battery, wherein the charging chopper provides a selected power to the at least one battery;
   a battery boost converter electrically connecting the at least one battery to the chopper bus;
   an auxiliary power converter being electrically connected to the chopper bus, the auxiliary power converter including a DC to DC converter;
   a controller in communication with the field-controlled generator, auxiliary power converter and the battery boost converter, wherein the controller selectively varies power output from the engine component, and the at least one battery via the chopper bus and battery boost converter, to provide power sufficient to perform the operation; and
   a user interface for receiving a welding output preset, wherein the user interface is powered, when the engine component is in the off condition, by the at least one battery through the battery boost converter, the chopper bus, and the DC to DC converter.

2. The power source of claim 1, wherein the auxiliary power converter is connected to a peripheral, wherein the auxiliary power converter provides power to the peripheral when the engine component is in the off condition.

3. The power source of claim 1, wherein the user interface includes an output, the output including a display.

4. The power source of claim 3, wherein the user interface further includes an input.

5. The power source of claim 1, wherein the user interface includes a contribution input allowing manual adjustment of a power balance between the engine component and the at least one battery, wherein, based on the contribution input, the user interface signals the controller to vary the power contribution of the engine component relative to the at least one battery.

6. The power source of claim 2, wherein the auxiliary power converter includes a DC to AC converter.

7. The power source of claim 6 further comprising an outlet, the outlet being electrically connected to the auxiliary power converter.

8. The power source of claim 1, wherein the at least one battery is adapted to provide the power output sufficient to perform the operation when the engine component is in the off condition.

9. The power source of claim 1, wherein the charging chopper includes a buck regulator that provides a selected charging voltage to the at least one battery.

10. The power source of claim 9 wherein the controller deactivates power output to the implement when the charging chopper is connected to the at least one battery.

11. The power source of claim 9 further comprising a battery monitor in communication with the controller and the at least one battery, wherein the battery monitor is adapted to determine the charge level of the at least one battery and report the charge level to the controller.

12. The power source of claim 1 wherein the battery boost converter is operable to increase power provided by the engine component with power from the at least one battery.

13. The power source of claim 1, wherein the user interface includes a quiet mode selection to operate the engine component in a quiet mode, wherein the engine component is operated to produce a selected noise level.

14. The power source of claim 13, wherein the selected noise level is less than 90 dB.

15. The power source of claim 13, wherein the selected noise level corresponds to operating the engine component at a selected revolutions per minute.

16. A power source for an implement performing a welding or cutting operation comprising:
an engine component including a field-controlled generator, the engine component being switchable between an on condition and an off condition;
a rectifier electrically connected to the field-controlled generator, wherein the rectifier converts alternating current provided by the field-controlled generator into a direct current;
at least one battery, wherein the engine component and at least one battery are electrically connected to a chopper bus, wherein a voltage droop of the chopper bus is controlled by field control of the field-controlled generator;
a charging chopper electrically connected to the field-controlled generator and the at least one battery, wherein the charging chopper provides a selected power to the at least one battery;
a battery boost converter electrically connected to the at least one battery;
an auxiliary power converter being electrically connected to the chopper bus, the auxiliary power converter including a DC to DC converter;
a controller in communication with the field-controlled generator, auxiliary power converter and the battery boost converter, wherein the controller selectively varies power output from the engine component and the at least one battery via the chopper bus and battery boost converter to provide power sufficient to perform the operation; and
a user interface for receiving a welding output preset, wherein the user interface is in communication with the controller, and wherein the user interface includes a contribution input allowing manual adjustment of a power balance between the engine component and the at least one battery, wherein, based on the contribution input, the user interface signals the controller to vary the power contribution of the engine component relative to the at least one battery,
wherein the user interface is powered, when the engine component is in the off condition, by the at least one battery through the battery boost converter, the chopper bus, and the DC to DC converter.

17. The power source of claim 16 further comprising a housing, wherein the auxiliary power converter is electrically connected to at least one outlet supported on the housing.

18. The power source of claim 16, wherein the user interface includes an input and an output.

19. The power source of claim 18, wherein the user interface includes a touch screen display.

20. The power source of claim 19, wherein the input includes at least one button.

21. The power source of claim 18, wherein the output includes a bar graph contribution display that visually displays the relative power contribution of the engine component and the at least one battery.

22. The power source of claim 16, wherein the chopper bus is connected directly across the rectifier.

* * * * *